L. M. WOLFFSOHN.
VEHICLE WHEEL.
APPLICATION FILED JAN. 30, 1909.
937,910.
Patented Oct. 26, 1909.
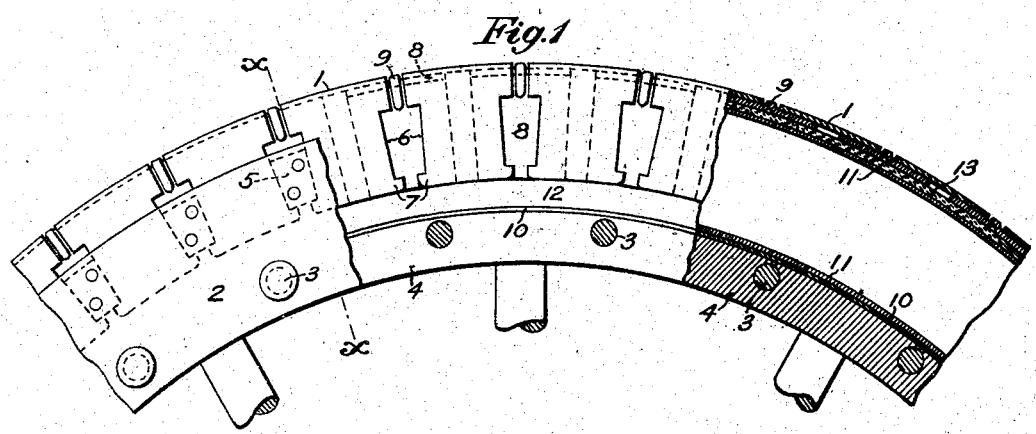
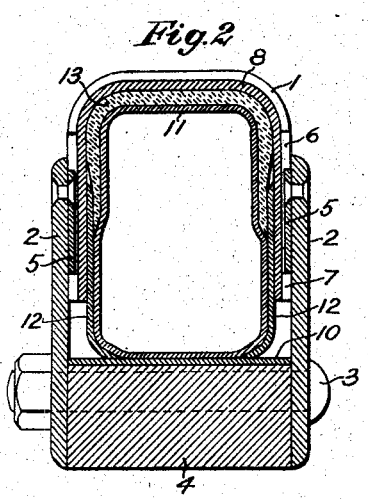
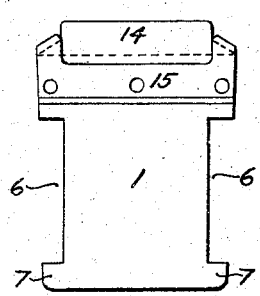
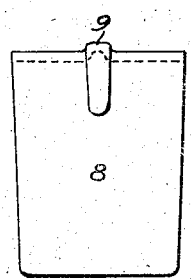
Witnesses
Charles P. Cook.
M. Held
Inventor
Lionel M. Wolffsohn
by his Attorney

UNITED STATES PATENT OFFICE.

LIONEL M. WOLFFSOHN, OF NEW YORK, N. Y., ASSIGNOR TO JAMES WOLFFSOHN, OF NEW YORK, N. Y.

VEHICLE-WHEEL.

937,910.  Specification of Letters Patent.  Patented Oct. 26, 1909.

Application filed January 30, 1909. Serial No. 475,113.

*To all whom it may concern:*

Be it known that I, LIONEL M. WOLFFSOHN, a citizen of the United States, residing at No. 220 West One Hundred and Seventh street, in the city of New York, county and State of New York, have invented new and useful Improvements in Vehicle-Wheels, of which the following is a specification.

My invention relates to vehicle wheels of the type in which the rim or tread portion is provided with resilient devices to yield to inequalities in the road surface upon which the wheel travels.

In the manufacture of wheels of the kind above referred to, of which the pneumatic-tired wheel is a type, many attempts have been made to devise a substitute for the pneumatic tire which shall preserve to a reasonable degree the resiliency of the pneumatic tire while avoiding its liability to puncture and wear. All such devices, so far as the inventor is informed, have heretofore proved unpractical by reason of their weight, complication, and expense, and of the serious deficiency in resiliency due to the weight of their moving parts or the friction in their joints.

The object of the present invention is to produce a resilient vehicle wheel which shall serve as an efficient and economical substitute for the pneumatic-tired wheel, and which shall avoid the defects of the prior devices before alluded to.

To attain the above mentioned object, I apply to the rim or felly of a wheel, of any ordinary or suitable construction, yielding means of novel construction which take the place of the pneumatic tire and its rim. In my construction I use, in common with some devices of the prior art, a plurality of tread-plates of metal or other non-resilient material, together with resilient means for supporting the tread plates. In my invention, however, the tread-plates are of a novel form, and are guided and controlled in their movements in a novel manner, so that I am enabled to use tread-plates of comparatively light weight. My construction as a whole is light and inexpensive, since all of its parts may be made of sheet metal, with the exception of the resilient means. The latter is preferably in the form of a pneumatic cushion or air tube, and when such a device is used, it is completely protected from injury, since it is not only shielded from puncture and from contact with the road surface but is also entirely relieved, by the mechanical parts of the construction, from lateral or peripheral strains, such as are encountered by the ordinary pneumatic tire.

The preferred embodiment of my invention is illustrated in the accompanying drawings, in which—

Figure 1 is a side elevation partly in section, of a portion of a wheel to which the present invention is applied. Fig. 2 is a transverse section on an enlarged scale, on the line *x—x* in Fig. 1, looking from left to right. Fig. 3 is a side elevation of a tread-plate modified by the addition of a resilient tread block. Fig. 4 is a side elevation of one of the joint-plates.

In the illustrated embodiment of my invention, the tread-surface of the wheel is formed by a plurality of U-shaped tread-plates 1, which are preferably made of steel or other hard and tough metal. In order to yield to inequalities in the road surface, the tread-plates are arranged to be independently movable in a radial direction, and to this end they are loosely mounted with their parallel members fitting closely, but not tightly, between two annular side-plates 2, also preferably of sheet metal, which are secured removably, by bolts 3, to the sides of the felly or rim 4 of the wheel.

The radial movements of the tread-plates are guided and limited by guide-lugs 5, which are riveted to the inner surfaces of the side-plates 2. These lugs engage recesses 6 in the lateral edges of the tread-plates, and the outward movement of the tread-plates is limited by the shoulders 7 at the inner ends of the recesses, when these shoulders abut against the lugs 5 in the normal outward position of the tread-plates. The recesses are sufficiently longer than the lugs, however, to permit the tread-plates to yield and slide toward the center of the wheel when inequalities in the road surface are encountered.

Within the tread-plates, and closing the joints therebetween, are U-shaped joint-plates 8, also preferably of sheet-steel. The joint-plates fit closely within the tread-plates, so as to exclude grit, and they are arranged to alternate or break joints with the tread-plates. They are retained in such position by means of outward projections or lugs 9 which engage the openings between contiguous tread-plates. These lugs 9 may be formed, as illustrated in the drawings, by striking up the sheet metal in suitable dies. They are made sufficiently narrower than the normal spaces between the tread-plates to allow for the narrowing of these spaces when the tread-plates are moved toward the center of the wheel.

The resilient means by which the tread-plates and the joint plates are yieldingly held in their outermost positions, have the form in the illustrated embodiment of my invention, of a pneumatic cushion comprising an annular air tube 11, which may be an ordinary inner or air tube such as is used in connection with pneumatic tires, and which may be inflated in the usual manner. The air tube is protected from contact with the moving plates by means of two annular guard plates 12 which are placed loosely within the joint plates, as shown in Fig. 2. The inner margins of these guard plates are curved to avoid sharp bends in the air tube in the angles between the guard plates and the rim. The air tube is further protected from contact with the tread-plates and the joint-plates by an outer shoe 13, which extends inwardly at the sides, as shown in Fig. 2, so as to cover the joints between the joint-plates and the guard plates. The shoe 13 is made of suitable flexible material such as felt, or a combination of textile material and rubber.

To prevent splitting of the felly or rim 4, which is usually of wood, a metal band 10 is shrunk or forced upon it between the side-plates.

In assembling and dis-assembling the wheel, the bolts 3 are removed, and the side-plates are moved to engage or disengage the guide lugs with the recesses in the tread-plates. When the bolts 3 are in place all the parts of the device are securely interlocked and unremovable. In assembling the wheel solid lubricant, such as graphite, is inserted between the movable parts. This is not essential, however, since the bearing surfaces are all so large, and the ranges of movement so small, that little wear and friction can occur.

It will be obvious that the pneumatic cushion is absolutely protected from punctures or cuts by the inclosing metal armor. It is also relieved from all lateral and peripheral strains, since the tread plates are rigidly confined to movement in radial directions and the air tube participates only in such radial movement.

Owing to the lightness and freedom of movement of the tread-plates and the joint plates, the former may be utilized to constitute the tread surface which engages the road, and such an arrangement is shown in Figs. 1 and 2. In some cases, however, as, for example, in running over streets paved with stones, it may be desirable to use a tread surface of resilient material. In such a case tread-blocks of rubber or other yielding material may be secured to the tread-plates as shown in Fig. 3. In this drawing a tread-block 14 is secured to the tread-plate by a plate 15 which is riveted to the tread-plate and has a central opening through which the tread-block projects.

While I prefer to use a pneumatic device for yieldingly supporting the tread-plates, my invention, in its broadest aspects is not limited to the use of such a device, but in some cases springs of any ordinary or suitable form may be a satisfactory substitute.

In general, it would be apparent that various modifications may be made in the illustrated embodiment of my invention within the nature of the invention and the scope of the following claims.

I claim:

1. A vehicle wheel having, in combination, a rim provided with two removable annular side plates, a plurality of U-shaped tread-plates with their parallel members arranged to slide radially between the side-plates, guide lugs fixed on the inner surfaces of the side-plates and engaging the tread-plates to direct and limit their radial movement, U-shaped joint-plates with their outer surfaces fitting closely against the inner surfaces of the tread-plates and having outward projections engaging the openings between adjacent tread-plates, two annular guard-plates located within the joint-plates, and a pneumatic cushion inclosed within the joint-plates and between the guard plates.

2. A vehicle wheel having, in combination, a rim provided with two side plates constituting an annular channel closed at the bottom, a plurality of U-shaped tread-plates of sheet metal arranged to slide within the channel, the edges of the tread-plates having recesses terminating at their inner ends in shoulders, guide lugs secured to the inner surfaces of the side-plates at the junctures between the tread-plates, each guide lug engaging said recesses in two adjacent tread plates and operating, by engagement with said shoulders, to limit the outward movement of the tread-plates, and U-shaped joint plates of sheet metal arranged within the tread-plates and having outward projections engaging the spaces between the tread portions of adjacent tread-plates.

LIONEL M. WOLFFSOHN.

In the presence of—
CLARENCE G. GALEHER,
FLORENCE B. ROY.